United States Patent

Tsuji et al.

Patent Number: 5,796,869
Date of Patent: Aug. 18, 1998

[54] IMAGE PROCESSING SYSTEM

[75] Inventors: Masato Tsuji; Masao Seki; Svay Leng; Koji Aikawa; Koichiro Shinohara; Fumio Nakaya, all of Kanagawa, Japan

[73] Assignee: Fuji Xerox Co., Ltd., Tokyo, Japan

[21] Appl. No.: 707,981

[22] Filed: Aug. 30, 1996

Related U.S. Application Data

[60] Continuation of Ser. No. 458,697, Jun. 2, 1995, Pat. No. 5,629,990, which is a division of Ser. No. 132,983, Oct. 7, 1993, Pat. No. 5,515,451.

Foreign Application Priority Data

Oct. 8, 1992 [JP] Japan ............................ 4-296323

[51] Int. Cl.$^6$ ............................................. G06K 9/46
[52] U.S. Cl. ........................... 382/203; 382/192; 382/187
[58] Field of Search .................... 382/187, 192, 382/203; 235/454

References Cited

U.S. PATENT DOCUMENTS

| | | | |
|---|---|---|---|
| 4,720,870 | 1/1988 | Billiotte et al. | 382/145 |
| 4,973,851 | 11/1990 | Lee | 382/135 |
| 5,050,227 | 9/1991 | Furusawa et al. | 382/269 |
| 5,054,094 | 10/1991 | Barski | 382/192 |
| 5,063,605 | 11/1991 | Samad | 382/293 |
| 5,216,724 | 6/1993 | Suzuki et al. | 382/135 |
| 5,308,960 | 5/1994 | Smith et al. | 235/454 |
| 5,319,182 | 6/1994 | Havens et al. | 235/462 |
| 5,319,722 | 6/1994 | Oki et al. | 382/293 |
| 5,321,470 | 6/1994 | Hasuo et al. | 382/135 |

*Primary Examiner*—Jose L. Couso
*Assistant Examiner*—Anh Hong Do
*Attorney, Agent, or Firm*—Finnegan, Henderson, Farabow, Garrett & Dunner, L.L.P.

[57] ABSTRACT

An image processing system which reads an image on an original document every pixel by a scanner, processes the read image data, and outputs the processed image data. The image processing system includes a system for recognizing a circular image of a specific color. The recognizing system includes a specific color detecting unit for detecting a specific color on an image on an original document; a first image detecting unit for detecting, in the image detected by the specific color detecting unit, images of the specific color at positions spaced from each other by a first distance corresponding to a diameter of a circle on a line extending in a fast scan direction; a second image detecting unit for detecting intersections of the circle having the diameter equal to the first distance and a line separated by a predetermined distance from a center of the circle in a slow scan direction when the specific color images are detected by the first image detecting unit; and a specific color image determining unit for determining that a contour containing the images of the specific color, detected by the three detecting units, is circular on the basis of the detection of a pitch line of a second distance by the second image detecting unit.

4 Claims, 13 Drawing Sheets

IMAGE PROCESSING SYSTEM

This is a continuation of application Ser. No. 08/458,697, filed Jun. 2, 1995, now U.S. Pat. No. 5,629,990 which is a divisional application of Ser. No. 08/132,983, filed Oct. 7, 1993, now U.S. Pat. No. 5,515,451.

BACKGROUND OF THE INVENTION

1. Field of the Invention

The present invention relates to an image processing rejecting document, and more particularly to a document specially printed in order to prevent exact copies of a color document, such as a bank bill and marketable securities. Further, the present invention relates to an image processing system with an illicit use check function for preventing exact copies of a color original document, such as the specially printed document, bank bill, and marketable securities.

2. Description of the Related Art

The copy rejecting technique of a conventional copying machine is categorized into two types of technique; a first technique giving an original document the function to reject a normal copy by the machine and a second technique in which the copying machine detects an original document not to be copied by the image reading/detecting unit and rejects a normal copy of such a document.

The first technique using the normal copy rejecting document comes in many varieties. A first example of this technique applies metal powder to a document. The copying machine reproduces images on the document other than images based on the metal powder by a document illuminating lamp. Another example is based on Moire or holography caused by combining a background pattern of a document print image and a mesh at the time of copying. An additional example uses ink of fluorescence which provides an unclear copy image. A further example uses blue ink which can be little reproduced by the copying machine using a selenium photoreceptor.

In the second technique detecting a document not to be copied in the image reading/detecting stage, the machine checks whether or not a document to be copied belongs to those documents that are allowed to be copied, in that stage. The checking operation is made by comparing the read image data with basic data stored in a memory. If the document is not to be copied, the machine does not operate for copying or produces the output image left unfixed or an abnormal output image.

However, the illicit use check techniques as mentioned above are not matured to the practical use, while having still problems to be solved. Accordingly, those techniques are not widely used. Further, the technique using the image reading/detecting unit indispensably uses a memory of a large memory capacity for storing the basic data of specific documents, and also comparing means for comparing the read or input image data with the basic data in order to check the input image data. The use of such a large memory and comparing means increases the cost to manufacture.

SUMMARY OF THE INVENTION

The present invention has been made in view of the above circumstances and has an object to provide a document for an image processing system which can prevent the reproduced documents from being illicitly used, by applying something simple to the document surface.

Another object of the present invention is to provide an image processing system capable of detecting an illicit use rejecting document, which can be realized at a relatively low cost and is applicable for every type of image processing system.

A still another object of the present invention is to provide an image processing system capable of detecting a circular image which is low in cost and applicable to every type of color copying machine, and more specifically to provide an image processing system capable of identifying bank bills.

To achieve the above objects, the first aspect of the invention provides an image processing system which reads an image on an original document every pixel by a scanner, processes the read image data, and outputs the processed image data, the improvement wherein the image processing system includes a system for recognizing a circular image of a specific color, and the recognizing system includes specific color detecting means for detecting a specific color on an image on an original document; first image detecting means for detecting, in the image detected by the specific color detecting means, images of the specific color at positions spaced from each other by a first distance corresponding to a diameter of a circle on a line extending in a fast scan direction; second image detecting means for detecting intersections of the circle having the diameter equal to the first distance and a line separated by a predetermined distance from a center of the circle in a slow scan direction when the specific color images are detected by the first image detecting means; and specific color image determining means for determining that a contour containing the images of the specific color, detected by the three detecting means, is circular on the basis of the detection of a pitch line of a second distance by the second image detecting means.

Also, the second aspect of the invention provides an image processing system which reads an image on an original document every pixel by a scanner, processes the read image data, and outputs the processed image data, the improvement wherein the image processing system includes a system for recognizing a circular image of a specific color, and the recognizing system includes specific color detecting means for detecting a specific color on an image on an original document; first image detecting means for detecting, in the image detected by the specific color detecting means, images of the specific color at positions spaced from each other by a first distance corresponding to a diameter of a circle on a line extending in a fast scan direction; second image detecting means for detecting intersections of the circle having the diameter equal to the first distance and a line separated by a predetermined distance from a center of the circle in a slow scan direction when the specific color images are detected by the first image detecting means; and specific color image determining means for determining that a contour containing, the images of the specific color, detected by the three detecting means, is circular when the number of pixels within a given area defined by a set of lines detected by the second image detecting means is within a specific number of pixels previously stored in memory means.

Further, the third aspect of the invention provides an image processing system which reads an image on an original document every pixel by a scanner, processes the read image data, and outputs the processed image data, improvement wherein the image processing system includes a system for recognizing a circular image of a specific color, and the recognizing system includes specific color detecting means for detecting a specific color on an image on an original document; first image detecting means for detecting, in the image detected by the specific color detecting means, images of the specific color at positions spaced from each other by a first distance corresponding to a diameter of a circle on a line extending in a fast scan direction; second image detecting means for detecting intersections of the circle having the diameter equal to the first distance and a line separated a predetermined distance from a center of the circle in a slow scan direction when the specific color images are detected by the first image detecting means; and specific color image determining means for determining that a contour containing the images of the specific color, detected by the three detecting means, is circular when the number of changes between ON and OFF of pixels within a given area defined by a set of lines detected by the second image detecting means is within a specific number of changes between ON and OFF previously stored in memory means.

BRIEF DESCRIPTION OF THE DRAWINGS

The accompanying drawings, which are incorporated in and constitute a part of this specification, illustrate embodiments of the invention and, together with the description, serve to explain the objects, advantages and principles of the invention. In the drawings.

DETAILED DESCRIPTION OF THE PREFERRED EMBODIMENTS

The preferred embodiments of the present invention will be described with reference to the accompanying drawings.

According to the first aspect of the invention, there is provided a circular image recognizing system for recognizing a circularly contoured image. The circular image can be read as a circular image irrespective of the direction in which the document is set on the platen. Accordingly, the means to recognize the image can be constructed relatively simply.

Figure 2:
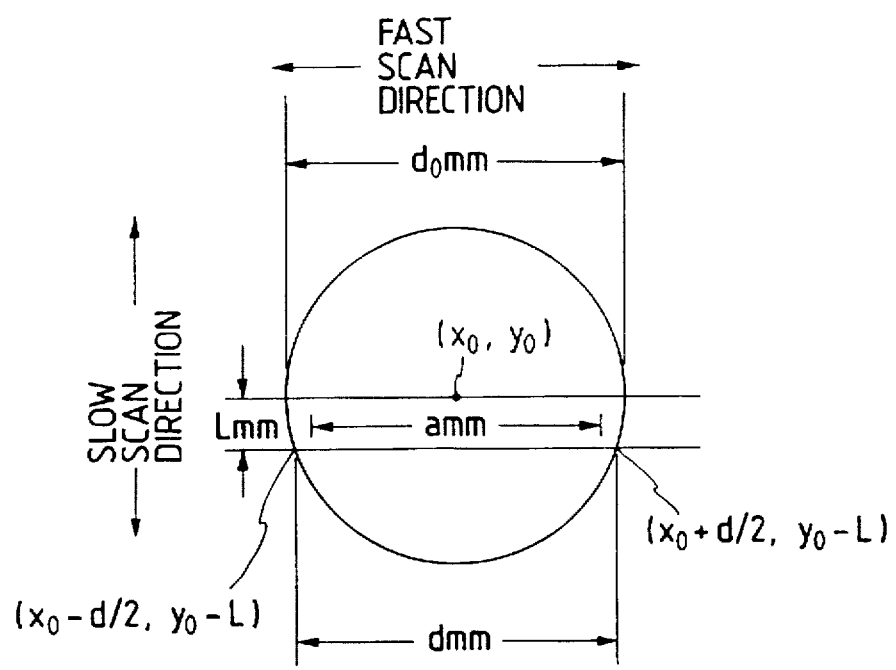
FIG. 2 is a diagram schematically showing the circular red print on the bank bill.

In FIG. 2, the first image detecting unit detects the pixels at positions spaced from each other a first distance corresponding to the diameter (e.g., $d_0$ mm) of a circle on the line extending in the fast scan direction. The second image detecting unit (e.g., $\underline{d}$ mm pitch) detects the pixels corresponding to the intersections $(x_0-d/2, y_0-L)$ and $(x_0+d/2, y_0-L)$ of the circle and a line separated a predetermined distance (e.g., L mm) from the center $(x_0, y_0)$ of the circle. Here, the following equation (1) holds among those distances $d_0$, L, and d $$d=2\{(d_0/2)^2-L^2\}^{1/2} \qquad (1)$$

where $d_0/2 > L > 0$.

When the pitch $\underline{d}$ satisfies the equation (1), the assumption that the image of a specific color is circular is correct. In this case, if the circular image is painted with the specific color, the equation (1) holds.

When the number of ONs within a predetermined distance (a mm) from the center of the $\underline{d}$ mm pitch line within the circle is counted, and is equal to a value corresponding to specific image data previously stored in a memory, the circular image of the specific color can be identified. The circular image can be also identified by counting the number of changes from ON to OFF and OFF to ON within the same area.

In a case where the specific image of the specific color is a circular red print of a bank bill, $d_0$ is 14.5 mm (on the obverse side of the bank bill) or 13.5 mm (on the reverse side). When the number N of ONs on the line where the $\underline{d}$ mm pitch line optionally selected is detected is equal to the number of red pixels of characters, e.g., "Bank of Japan" within the circular red print of the bank bill, it can be determined that the detected circular red data is the circular red print.

The reason why the red pixel detecting position is shifted L mm from the center $(x_0, y_0)$ of the circle in the slow scan direction follows. There is a case where no character is printed on the line passing through the center of the circular red print of the bank bill, within the circle of the red print. In this case, if L=0 mm, a case where the system fails to count the red pixel on the line where the $\underline{d}$ mm pitch line is detected occurs.

According to another aspect of the present invention, a circular image consisting of a code in the form of a plurality of concentric circles in which the thick values of the circles, the spaces among the circles, or the diameters of the circles are different, is formed on an original document, is printed on a proper area on the surface of the original document. If the image processing system is designed to have the function to discriminate the concentric circle code, the image processing system can easily discriminate the document as in the case of using the bar codes currently widely used. The processing following the discriminating of the document in question can be carried out by an image processing system with the illicit use check function. The illicit use check function can be variously realized by inhibiting the subsequent image processing, inhibiting the fixing process, changing the image writing timings to abnormal ones, changing toner colors to other colors than the document colors, by using toner of fading colors, or the like.

A procedure of detecting a document bearing a concentric circle code printed thereon by the image processing system of the invention will be described.

Figure 5:
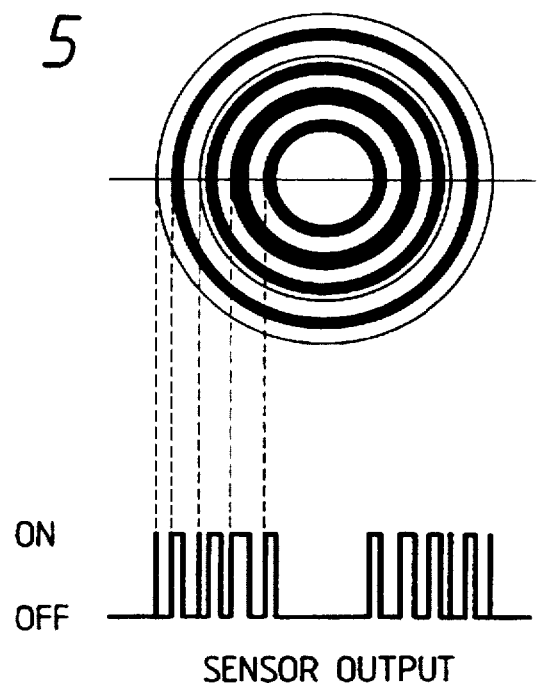
FIG. 5 is a diagram showing a concentric circle code according to another embodiment of the present invention.

As shown in FIG. 5, a sensor detects a distribution of densities on the diameter of the concentric circles detected by the concentric circle image detecting unit, in the form of ONs and OFFs. The detected density data is compared with the stored data. ON time duration, the number of ONs, ON/OFF pitches or the like may be used for expressing the density data by the sensor. A pattern (pitch and distance) of the chord on the diameter of the concentric circles or a line at a predetermined distance from the center of the circle, and the distances among the intersections of the concentric circles on the chord are stored. When they are coincident with a pattern corresponding to the concentric circles previously stored, it is determined that the detected circular image is the specific concentric circles.

Another procedure of detecting a document bearing a concentric circle code printed thereon by the image processing system of the invention will be described with reference to FIG. 8.

Figure 8:
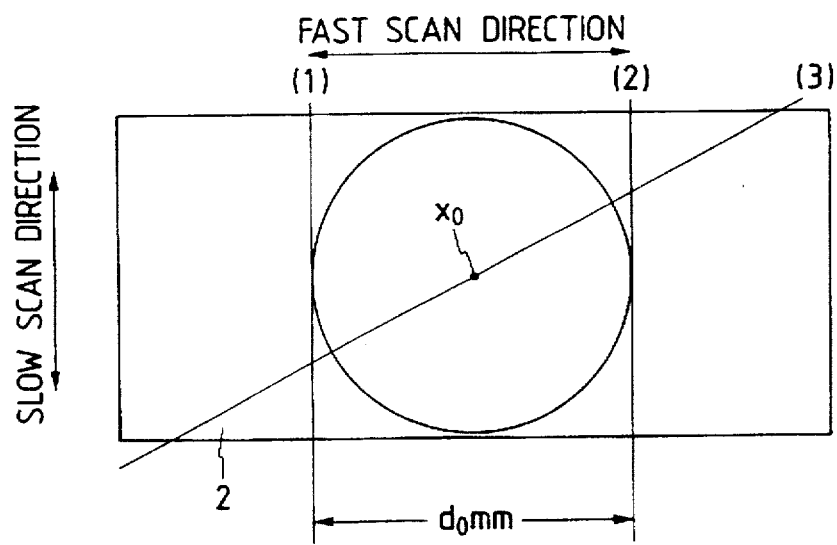
FIG. 8 is a diagram useful in explaining the way to detect concentric circles.

When the concentric circle detecting unit detects the image signal ((1) in FIG. 8) in the fast scan direction, the thinning unit thins the image signal, even if it consists of a plurality of pixel signals, into a single pixel signal. The thinning operation of the image signal is effective when horizontal pitch signal detecting unit detects a pixel signal ((2) in FIG. 8) in the fast scan direction located ahead a predetermined distance corresponding to the diameter (e.g., $d_0$ mm) of the circle on the line extending in the fast scan direction. More specifically, also when the circle is continuously detected in the range from the detection of the first circle pixel signal ((1) in FIG. 8) to beyond the $d_0$ mm pitch, the horizontal pitch signal detecting unit located ahead the $d_0$ mm pitch distance ((2) in FIG. 8) can detect the pixel detecting signal, if the circle pixel signal as indicated by (1) in FIG. 8 is thinned. Accordingly, there is eliminated the erroneous detection of it as the specific color image signal of the $d_0$ mm pitch corresponding to the circle diameter.

When the image signal is detected by the concentric circle detecting unit, the image data represented by the image signal is stored in the detected image storing unit. When horizontal pitch signal detecting unit detects a pixel signal ((2) in FIG. 8), the detected pixel signal data of the concentric circle at both ends of the diameter $d_0$ mm long of the circle on the oblique line turned a predetermined angle from the fast scan line about the center position $x_0$ of the circle on the assumption that the pixel signals ((1) and (2) in FIG. 8) detected by the thinning unit and the horizontal pitch signal detecting unit are at both ends of the diameter, is picked up from the data stored in the detected image storing unit.

When the oblique pitch signal detecting unit detects a state that the image data at both ends of the diameter of the circle on the oblique line is contained the image data stored in the detected image storing unit ((3) in FIG. 8), the circular image determining unit determines that the input image is the concentric circles image. The detection of the predetermined distance pitch signal in both the slow scan direction and the oblique direction further improves the accuracy of the determination.

When the oblique pitch signal detecting unit detects image data, determining unit operates such that when it is determined by comparison that the count of the counter unit is within a specific number of pixels previously stored, the determining unit determines that the image detected by the detecting unit is a specific concentric circular image.

In this way, the determining process of the concentric circles of the $d_0$ mm diameter previously set is repeated, thereby discriminating the specific concentric circle code.

According to a further aspect of the present invention, in the image processing system for printing pattern information, such as character information and coded information, on a copy sheet, information peculiar to the image processing system may be contained, and the system may be readily identified by decoding the information.

When the pattern data is printed using specific color information, e.g., yellow to which the eyes of a human are sensitive to the smallest degree, or below the threshold level of visual perception, the printed pattern information is not or scarcely seen. Accordingly, the reproduced document has sufficient print quality in normal use. When the pattern information thus printed is filtered or decoded, it is easy to check as to whether or not the reproduced document is a copy of the document not to be copied.

In the case of the periodic pattern, the pattern data is printed uniformly over the entire surface of the copy sheet, thereby preventing a part or parts of the copy sheet from being illicitly used.

Figure 17:
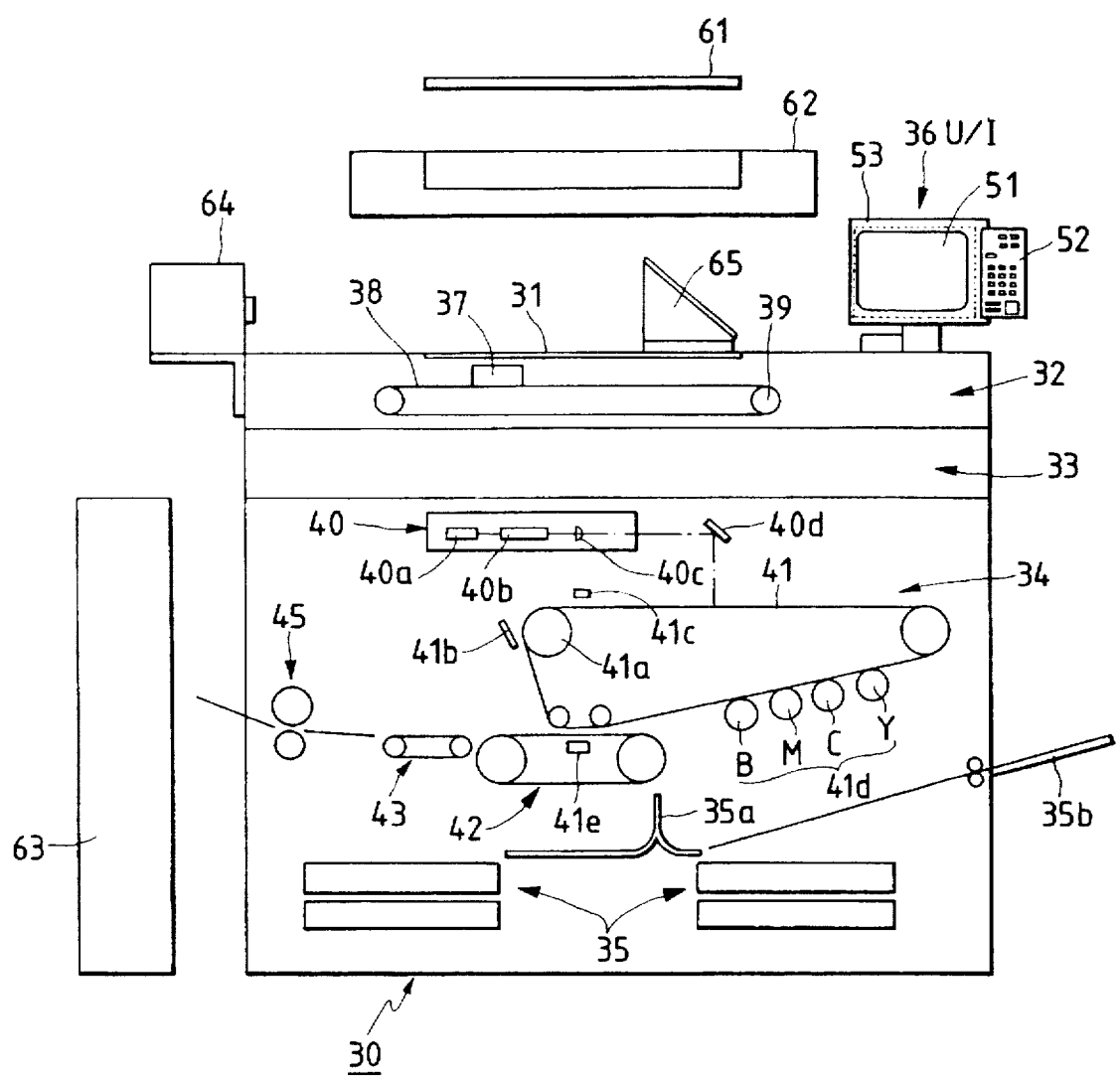
FIG. 17 is a longitudinal sectional view showing the overall construction of a color copying machine to which the embodiments of the present invention are applicable.

The overall construction of a digital color copying machine as a variation of an image processing system to which the embodiments of the present invention are applicable is shown in FIG. 17.

In the color copying machine shown in FIG. 17, a base machine 30 includes a platen glass 31 on which an original document is located, an image input terminal 32, a circuit board containing section 33, an image output terminal 34, paper trays 35, and a U/I (user interface) 36. The color copying machine further includes as optional components, an editing pad 61, an ADF (automatic document feeder) 62, a sorter 63, and a film image reader including a F/P (film projector) 64 and a M/U (mirror unit) 65.

The image input terminal 32 includes an imaging unit 37, a wire 38 for driving the imaging unit 37, a drive pulley 39, and the like. In operation, light is separated into three primary colors blue (B), green (G) and red (R) by color filters in the imaging unit 37. Image information on a color original document that is read by a CCD line sensor is converted into digital image signals B, G and R of multitone. The converted image signals are supplied to an image processing system. The image processing system is contained in the circuit board containing section 33. In the image processing system, the received image signals of B, G and R are subjected to various types of processings for improving color, tone, definition, and other image quality and reproduction. These processings are various conversion processings, correction processings, editorial processings, and others. The color image signals thus processed are converted into image signals of toner colors, Y (yellow), M (magenta), C (cyan), K (black or real black). The toner signals of the process colors are converted into on/off or binarized toner color signals. Then, those toner color signals are output to the image output terminal 34. The image output terminal 34, including a scanner 40 and a photoreceptor belt 41, converts the received image signals into optical signals by a laser output section 40a. The optical signals are applied onto the photoreceptor belt 41 through a route of a polygon mirror 40b, an F/θ lens 40c, and a reflection mirror 40d. The applied optical signals depict a latent electrostatic image corresponding to an image on the original, on the photoreceptor belt 41. The latent electrostatic image is developed and transferred on a sheet of paper transported from one of the paper trays 35. The thus formed color copy is discharged from the machine.

In the image output terminal 34, the photoreceptor belt 41 is driven by a drive pulley 41a. A cleaner 41b, a charger 41c, developing units 41d of Y, M, C and K, and an image transfer device 41e are disposed around the photoreceptor belt 41. A transfer unit 42 is disposed in opposition to the image transfer device 41e. In the image output terminal, a sheet of paper supplied from one of the paper trays 35 is transported through a paper transport path 35a to the transfer unit 42. For the 4-color full color copy, the transfer unit 42 is rotated four times to transfer the color images of Y, M, C and K onto the sheet of paper. The sheet bearing the transferred color image is transported from the transfer unit 42 to a fusing unit 45, through a vacuum transporter 43. The color image is fused or fixed by the fusing unit 45, and discharged outside. A SSI (single sheet inserter) 35b is used when sheets of paper are selectively supplied to the paper transport path 35a by a manual operation.

The U/I 36 is used when a user selects his desired functions and enters the instructions to execute the functions to the machine. The U/I 36 includes a color display 51 and a hard control panel 52, and additionally an infrared-rays touch board 53 which allows a user to directly give instructions to the machine by soft buttons on the screen.

The circuit board containing section 33 contains a plurality of control boards divided for every control unit, such as the image input terminal 32, the image output terminal 34, the U/I 36, the image processing system, and the F/P 64, an MCB (machine control board) for controlling the image output terminal 34, the ADF 62, the sorter 63, and the like, and an SYS board for controlling all of those controllers.

Figure 18:
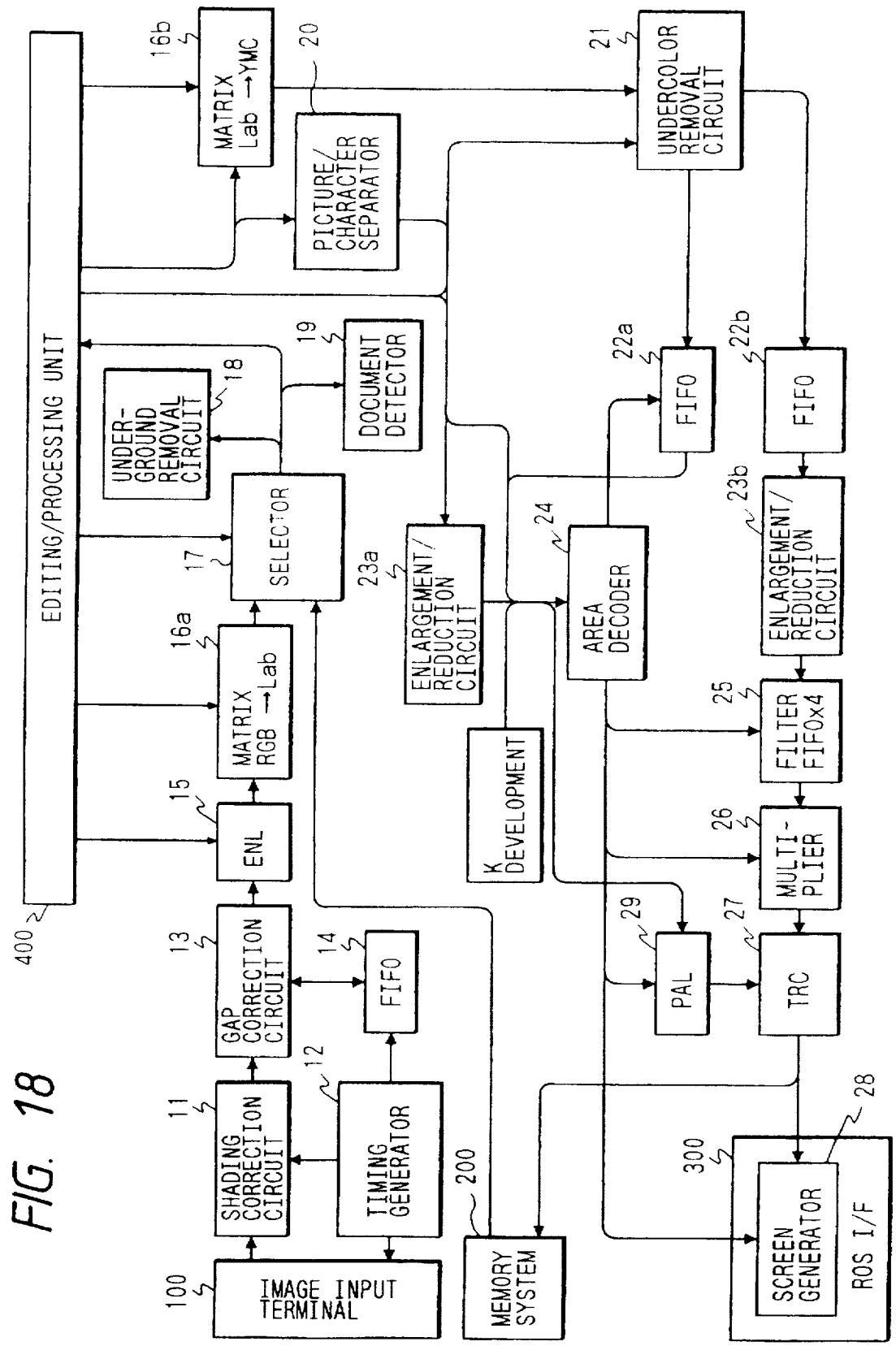
FIG. 18 is a block diagram showing a control system for the color copying machine.

A control system for the copying machine of FIG. 17 is arranged as shown in FIG. 18.

An image input unit 100 includes a reduction-type sensor consisting of three line sensors of R, G and B, that are arrayed in the direction orthogonal to the slow scan direction (page sync. direction). The sensor is scanned in synchronism with timing signals from a timing generator 12, to read an image on an original document. The image data thus read is applied to a shading correction circuit 11 where the image data is shading corrected for the balance among the pixels of the image data caused by various factors. In a gap correction circuit 13, the image data from the shading correction circuit 11 is subjected to a gap correction for the gaps of the line sensors. In the gap correction, the image data read by a data amount corresponding to the gap is delayed by an FIFO 14 so that the image data of R, G and B at the same position are aligned at the same time point.

In an ENL (equivalent neutral lightness) 15 for gray balance, the gray levels are inverted every pixel to effect the negative/positive inversion, by a negative/positive inversion signal from an editing/processing unit 400 which performs various processings for color conversion, color editing, area generation, pixel density conversion, and the like. For example, it is possible to make the negative/positive inversion of only a specified area. To gain an easy interface with other circuits, an RGB→Lab matrix 16a converts the R, G and B image signals, which were gray balanced by the control signal from the editing/processing unit 400, into image signals of L', a' and b'. A selector 17 selectively picks up the output signal of the RGB→Lab matrix 16a or image data from a memory system 200 as an interface with an external computer. The selector 17 is connected to an underground removal circuit 18 where the pixels of the optical densities lower than the underground density are neglected to improve the quality of copy, and further to a document detector 19 for detecting and storing document sizes.

A Lab→YMC matrix 16b converts the image signals of L', a' and b', which were color processed by the editing/processing unit 400, into toner color signals of Y, M and C. A picture/character separator 20 groups the pixels of the color processed image data into a plurality of blocks of pixels, thereby to discriminate the image areas of color character, black character, and pattern (character/half-tone). An undercolor removal circuit 21 generates the real black, removes the equal quantities of colors Y, M and C according to a monocolor/full color mode signal and the real black, and produces the image data of the process colors. The circuit 21 recognizes hue thereby to produce a hue signal. The hue signal is temporarily stored in an FIFO 22a. The image data consisting of the half-tone image signal in the pattern and character image signals of black and color characters is temporarily stored in an FIFO 22b. The hue signal, together with a signal based on the pattern/character separation result, is decoded by an area decoder 24. In accordance with this control signal, a filter 25, a multiplier 26 and a TRC 27 operate to process the image data output from the FIFO 22b.

An enlargement/reduction circuit 23a performs the enlargement/reduction so that an execution area by area control data for the image is not deviated even when an enlargement/reduction mode is set up. The enlargement/reduction area control data, if necessary, is decoded by the area decoder 24, and used for various processings. The area decoder 24 receives editing command, area discrimination, and hue signals, and generates signals to switch the parameters of them. The image data enlarged or reduced by the enlargement/reduction circuit 23b is applied to the filter 25 where Moire is removed and edge is emphasized. The multiplier 26 and the TRC 27 properly select coefficients for the color components and conversion tables, thereby the color adjustment and density adjustment of the color characters, black characters and patterns are performed. In the multiplier 26 the image data is calculated to correct the conversion tables of the TRC 27. The TRC 27 adjusts the optical density in conformity with the characteristic of the image output terminal 34. In the PAL 29, the conversion table of the TRC 27 is switched to another according to the developing process and the area discrimination. The image data adjusted is stored in the memory system or developed into dot patterns in the screen generator 28 of a ROS 300 and output in the form of a dot image.

The color copying machine thus constructed reads a circular red print of a bank bill. The copying machine recognizes that the original document currently being read is a bank bill, on the basis of the read circular red print, and inhibits an abnormal copy of the document, or the bank bill. To achieve this function, the copying machine includes a red-circular-print recognizing system.

Figure 1:
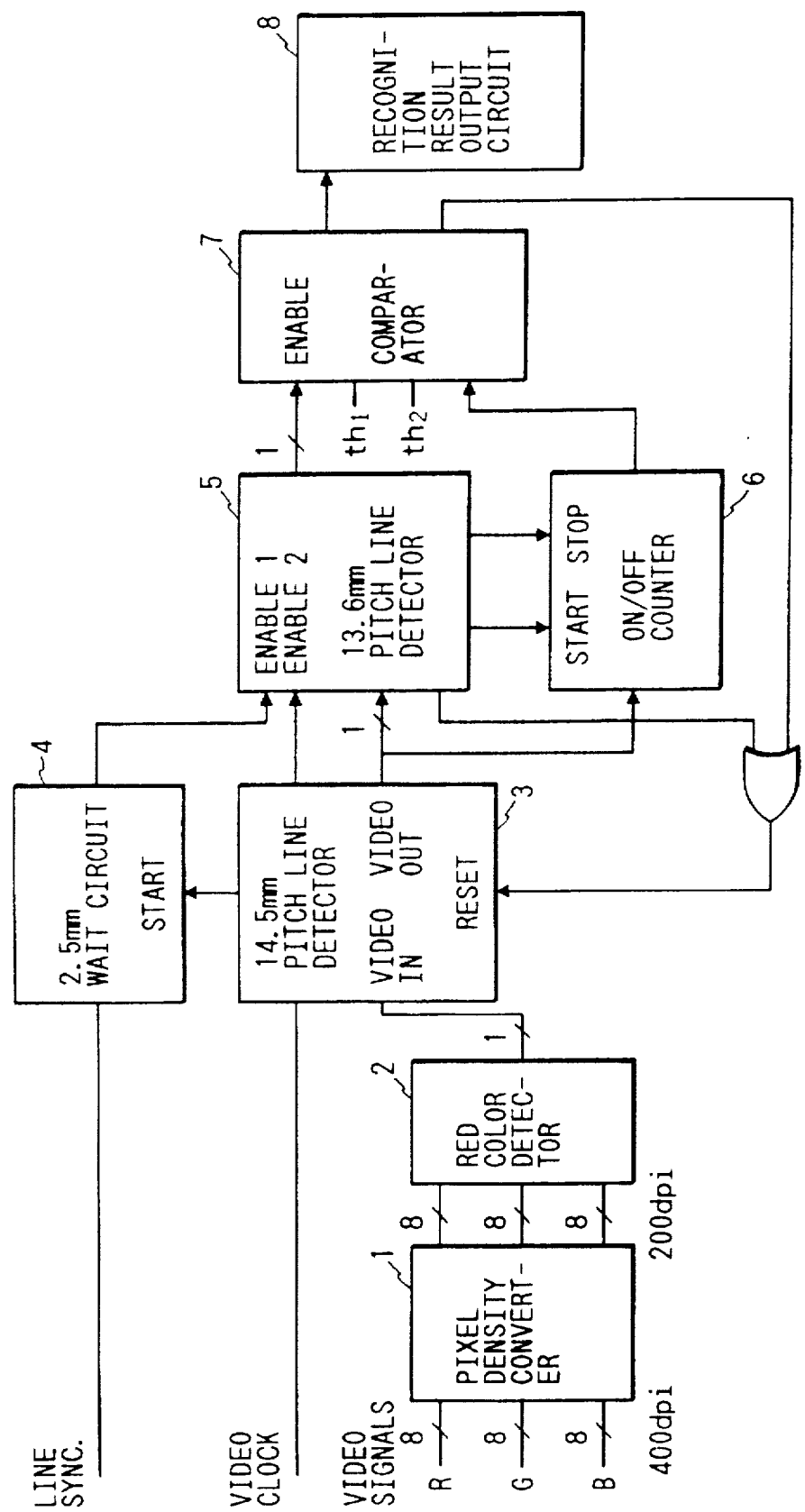
FIG. 1 is a block diagram showing a system for recognizing a circular red print on a bank bill according to an embodiment of the present invention.

An arrangement of the red-circular-print recognizing system is illustrated in block form in FIG. 1.

Bank bills issued by the Bank of Japan have circular red prints on both sides thereof, as already described. The circular red print on the obverse side of the bank bill is 14.5 mm in diameter and that on the reverse side is 13.5 mm. These diameter figures are common to every type of the bank bills, but the pattern of the circular red print on the obverse side is different from that on the reverse side. In the description to follow, it is assumed that the circular red print has a circle as shown in FIG. 2.

A procedure for recognizing the circular red print on the obverse side of the bank bill will typically be described.

The CCD line sensor (not shown) of the color copying machine starts to scan the surface of a bank bill as an original document. In the bank bill, there is no red print in the vicinity of the circular red print. Accordingly, when the CCD line sensor starts to read an image on the surface of the bill in the fast scan direction (the scan direction by the CCD), and the line sensor senses red pixels for the 14.5 mm pitch corresponding to the diameter of the circular red print of the bank bill, it could be determined that the detected pixels are those of the circular red print of 14.5 mm in diameter. While the red pixels for the 14.5 mm pitch are detected, the pixels may be continuously in ON states or may be discontinuously in ON states owing to a circle as contour of the circular red print of the bank bill or characters within the circle.

Then, check is made as to whether or not the sensor can detect red pixels at the intersections of the line located at the distance of a given pitch (L mm pitch) from the center ($x_0$, $y_0$) of the 14.5 mm diameter circle in the slow scan direction. Here, the pitch L may take any of the values smaller than 7.25 mm which is the radius of the circle. If the red pixels are sensed at the intersections on the line displaced the L mm pitch distance, the assumption that the sensed red pixel signals are those of the circular red print is true.

The number N of ONs over the range of a given distance ($\underline{a}$ mm) within the $\underline{d}$ mm pitch line shifted the distance of L mm is counted. The distance $\underline{a}$ mm is set to correspond to a print area of characters, for example, "Bank of Japan", within the circle of the circular red print ($a \leq d$). If the number N of pixels (number of ONs) within the $\underline{a}$ mm pitch on the $\underline{d}$ mm pitch line is equal to the number of pixels on the $\underline{d}$ mm pitch line previously stored in a buffer memory, which corresponds to the characters, for example, "Bank of Japan", within the circle, it is determined that the sensed circle red data represents the circular red print of the bank bill.

In the block diagram of the red-circular-print recognizing system shown in FIG. 1, a pixel density converter 1 converts a pixel density from 400 dpi to 200 dpi. When a red color detector 2 detects a circular red print, a 14.5 mm pitch line detector 3 detects red color at the distance of 14.5 mm from the start point of the circular red print in the fast scan direction. In order to detect red pixels on the line separated by the distance L mm in the slow scan direction, a wait time corresponding to the distance of L mm (2.5 mm in this embodiment) in the slow scan direction (FIG. 2) is controlled by a 2.5 mm wait circuit 4. After waiting for a time corresponding to the distance of 2.5 mm in the slow scan direction, a 13.6 mm pitch line detector 5 detects a $\underline{d}$ mm (13.6 mm in this embodiment) pitch line (FIG. 2). An ON/OFF counter 6 counts the number N of ONs over the line of a preset distance ($\underline{a}$ mm) located at the center of the 13.6 mm pitch line. A comparator 7 compares the counted values N of ONs with the numerical value stored in a buffer memory (not shown). If the counted value N is within the range between threshold values $th_1$ and $th_2$, it is determined that the red signal represents the circular red print of the bank bill. The result is output from a recognition result output circuit 8.

When the equation $N=wN_1+(1-w)N_2$ is used for N, an accuracy of the decision is further improved. In the above equation, $N_1$ stands for the number of ONs, and $N_2$ stands for the number of ON/OFF changes.

In the case of the circular red print on the bank bill issued by the Bank of Japan, L=2.5 mm, and the counted value N=5 to 25 when w=0.1.

Only the memory capacity large enough to store the threshold values $th_1$ and $th_2$ of the ON/OFF count is required for the buffer memory in the red-circular-print recognizing system. This contributes to the cost reduction of the system.

Figure 3:
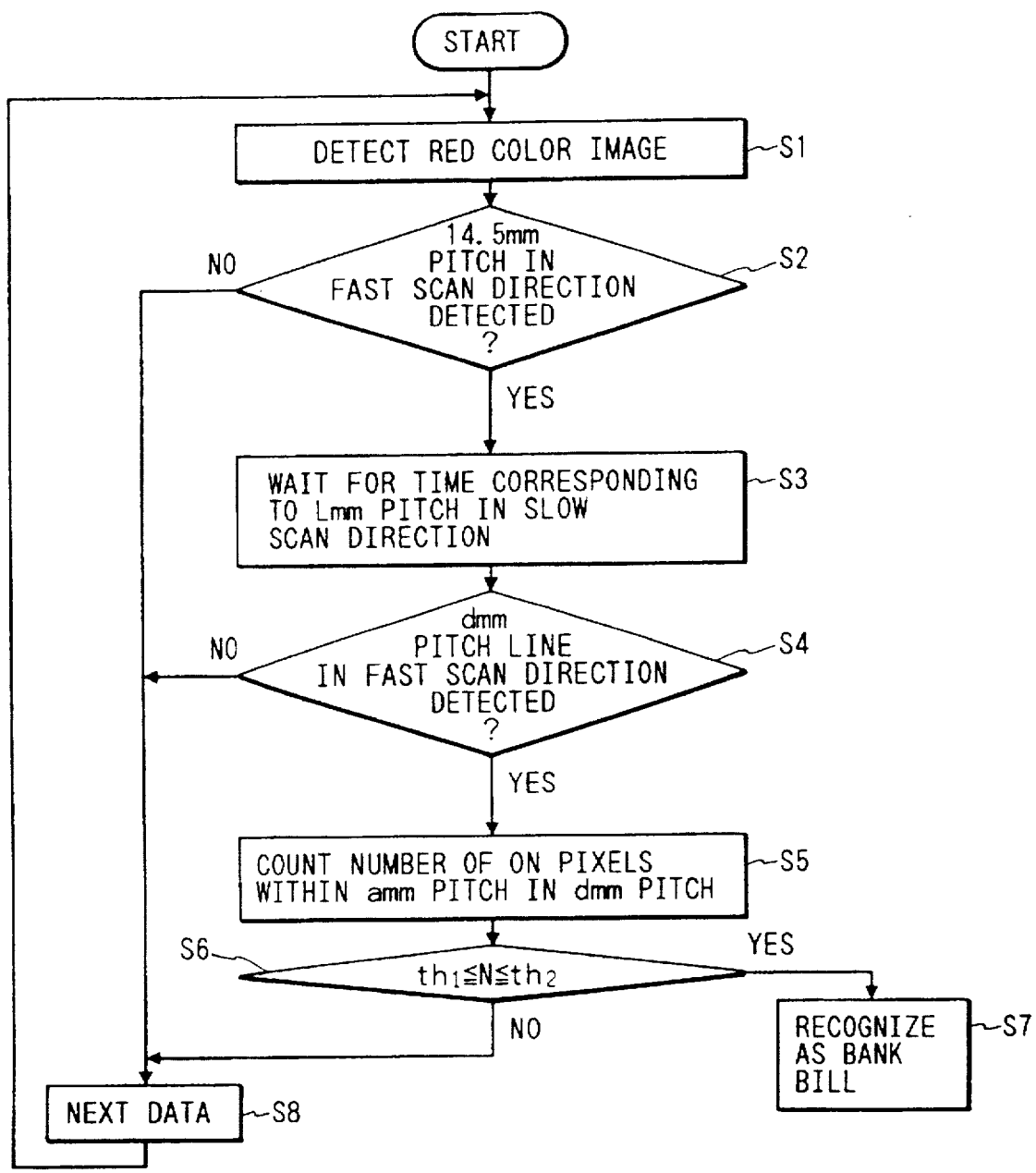
FIG. 3 is a flowchart for explaining the bank bill recognizing operation.

FIG. 3 is a flowchart showing a flow of a process to recognize the circular red print on the bank bill.

In FIG. 3, at first, a red color image is detected (step S1). Then, it is determined whether or not the 14.5 mm pitch has been detected in the fast scan direction (step S2). If the 14.5 mm pitch has been detected, the machine waits for the time corresponding to the L mm pitch in the slow scan direction (step S3), and it is determined whether or not the $\underline{d}$ mm pitch line has been detected in the fast scan direction (step S4). If the $\underline{d}$ mm pitch line has been detected, the number of ON pixels is counted within $\underline{a}$ mm pitch in the $\underline{d}$ mm pitch (step S5), and it is determined whether or not the condition $th_1 \leq N \leq th_2$ is satisfied (step S6). If the condition is satisfied, the machine recognizes the original document as a bank bill (step S7). In step S2, S4 or S6, if the answer is "No", the next data is received (step S8), going back to step S1.

The red-circular-print recognizing system of the present embodiment is preferably designed to be inoperable in copying a monochromatic document or a color document in the form of a monochromatic copy. If so designed, when an original document to be copied is of the type not requiring the process of recognizing the circular red print, the color copying machine can directly enter the copying operation without any interruption by the red-circular-print recognizing system. Accordingly, the red-circular-print recognizing system may be designed so that it is operated only in the full color copy or three-color copy mode.

Now, the handling of the bank bill using magnetic ink will be described. A bank bill detecting system is used which includes magnetic sensors for sensing this type of bank bill when the bank bill is located on the platen. The magnetic sensors are provided within the platen cover. This bank bill detecting system is combined with the above-mentioned red-circular-print recognizing system so that the red-circular-print recognizing system is operated only when it receives a signal produced by the magnetic sensors when they sense the bank bill. With this arrangement, normal original documents other than bank bills can be efficiently copied without any interruption by the red-circular-print recognizing system. The red-circular-print recognizing system operating following the magnetic sensing operation can recognize the bank bills at sufficiently high accuracy by merely recognizing a red circle of 14.5 mm pitch or a circle of the same pitch. The magnetic sensors may be disposed at key positions at intervals somewhat shorter than the print width of the magnetic ink. Those sensors are not necessarily provided over the entire surface of the platen cover.

In another method, when the magnetic sensors within the platen cover reactively operate, the 100% copy is prohibited without operating the red-circular-print recognizing system.

Further, when the magnetic sensors react, a paper quality sensor may detect the quality of sheets of paper contained in the paper tray. If the detected paper quality is that of paper of the type possibly being illicitly used, the machine operation is stopped. In this case, the paper quality sensor may be attached to within the paper tray. Additionally, the machine is designed so as to produce a copy of the bank bill of which the color area alone is painted to have another color or to produce the copy developed using odor toner. As a matter of course, those operations may be combined properly.

Additionally, any of the following methods may be employed: 1) to increase gloss of the sheet of paper on which a document image is copied by any of or a combination of the above-mentioned methods, 2) to check as to whether or not the print is present on the reverse side by a photo sensor, for example, located near the register roller when the machine operates in a both-side copy mode (particularly when manually operated), and 3) to detect a friction (slip) of the feed roller at the time of both-side copy decision. The machine determines whether or not the copy is to be illicitly used on the basis of the result by any of the above methods. If the copy may be illicitly used, the machine stops the copying operation.

In another effective method, a histogram of densities or a print pattern peculiar to the original document, such as a bank bill, for example, the number of the detected pixels in each of density areas, is stored in a memory. Check as to whether or not the original document is legally prohibited from being copied is made on the basis of the stored data. The histogram may be prepared for a specific area or areas on the document or the entire area thereon.

In an additional method, densities or a profile of a print pattern peculiar to an original document, for example, density variations in the direction orthogonal to the coordinate axes longitudinally extending on the document, is stored in a memory. The stored data is used for checking whether or not the original document to be copied is legally prohibited from being copied. The profile may be prepared for a specific area or areas on the document or the entire area thereon.

In a further method, the features of a specific portrait on a bank bill are stored in a memory. When input image data satisfies the features, it is determined that the original document set to the machine is a bank bill. Since a transparency is the chief note of the bank bill, the features of the transparency on the bank bill may be used in lieu of the features of the portrait.

Figure 4:
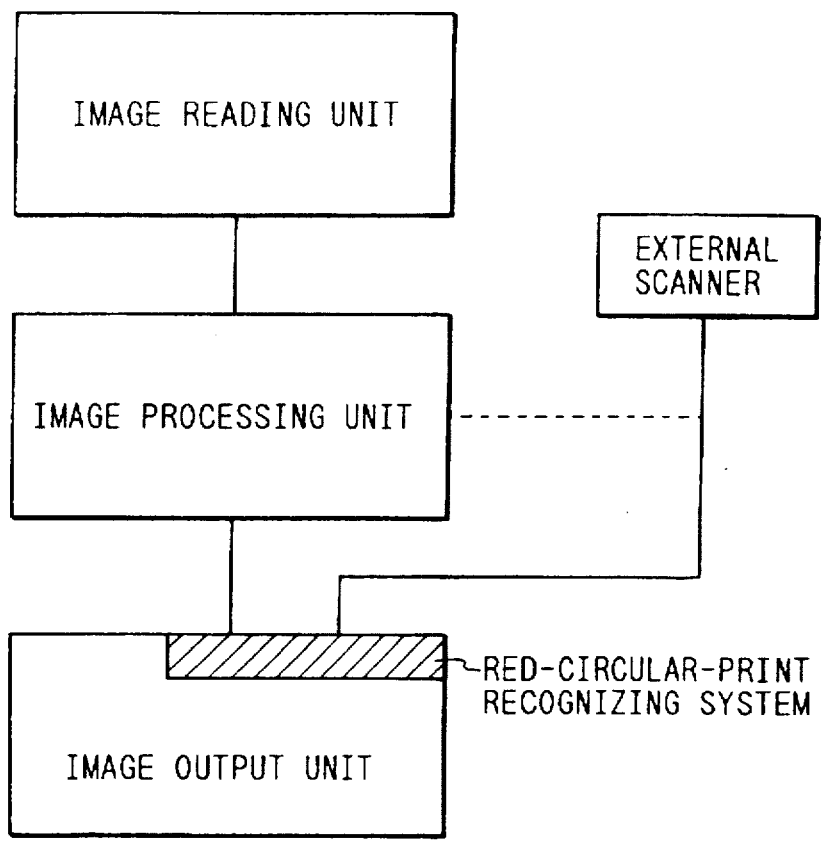
FIG. 4 is a block diagram showing a hardware arrangement of an image processing system with the red-circular-print recognizing system.

A hardware arrangement of an image processing system with the red-circular-print recognizing system is shown in FIG. 4. As shown, the red-circular-print recognizing system is contained in an image output unit. In this arrangement, not only a scanner signal from the image reading unit but also a scanner signal the image output unit directly receives from an external device may be passed through the red-circular-print recognizing system.

When the red-circular-print recognizing system identifies the circular red print of the bank bill, the document now set on the platen is a bank bill, and the timings to start the writing of the images on the obverse and reverse sides of the sheet of paper may be set random by using a table of random numbers. When the times to start the image writing vary unpredictively, it is impossible to copy the bank bill.

In another method to check the illicit use of the bank bill copy, after the red-circular-print recognizing system identifies the circular red print of the bank bill, a series of characters meaning a copy of the bank bill, for example, a message of "COPY", "UNUSABLE" or the like, may be automatically printed in the form of a logo mark on either obverse or reverse side of the copy.

The logo mark by the manufacturer of the copying machine may be printed on the sheet immediately after the machine has completed the copying operation or in a standby mode of the machine. The print of the logo mark checks the illicit use of the bank bill copy. The print of the logo mark on all of the copies is useful in preventing an infringement of copyrights. This is particularly useful since recent high performance color copying machines can readily copy artistic photographs.

Various possible methods for checking the illicit use of bank bill copies have been described in connection with the red-circular-print recognizing system. It is evident that the present invention is operable for checking the illicit use of other documents than the bank bills. The illicit use check methods as described above may be properly combined, if required.

Next, a document having a special print to prevent a color document, such as a bank bill and marketable security, from being exactly copied and an image processing system for processing such a document will be described.

FIG. 5 is a diagram showing a concentric circle code according to another embodiment of the present invention. A regularity is set up in at least one item of the thick values, diameters and intervals of the circles. The copying machine discriminates the regularity to operate for the illicit use check purpose.

The rules of the optical bar codes, which are currently used in a worldwide scale, are available for the concentric circular codes. Accordingly, the illicit use check function based on the rules is valid in any country. The function of discriminating the concentric circular codes can be realized by incorporating a concentric circular code recognizing function to be given below into the color copying machine.

The circular image is used in this embodiment. The reason for this follows. The circular image can be read as a circular image irrespective of the direction in which the document is set on the platen. Accordingly, the means to recognize the image can be constructed relatively simply.

Figure 6:
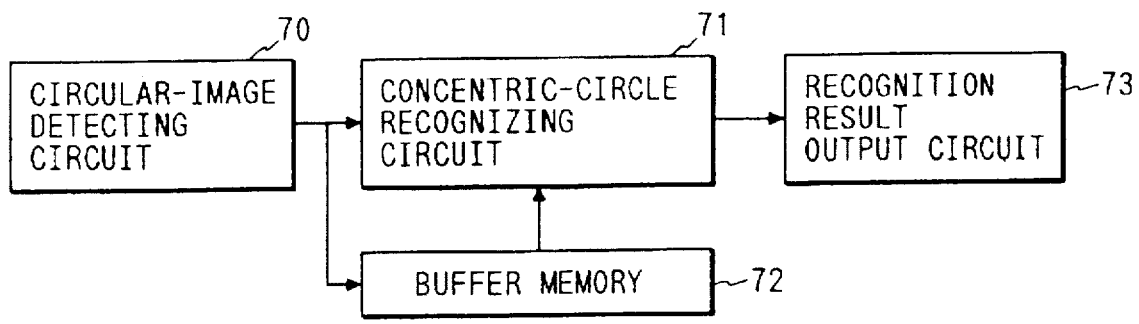
FIG. 6 is a block diagram showing a concentric circle code discriminating system.
Figure 7:
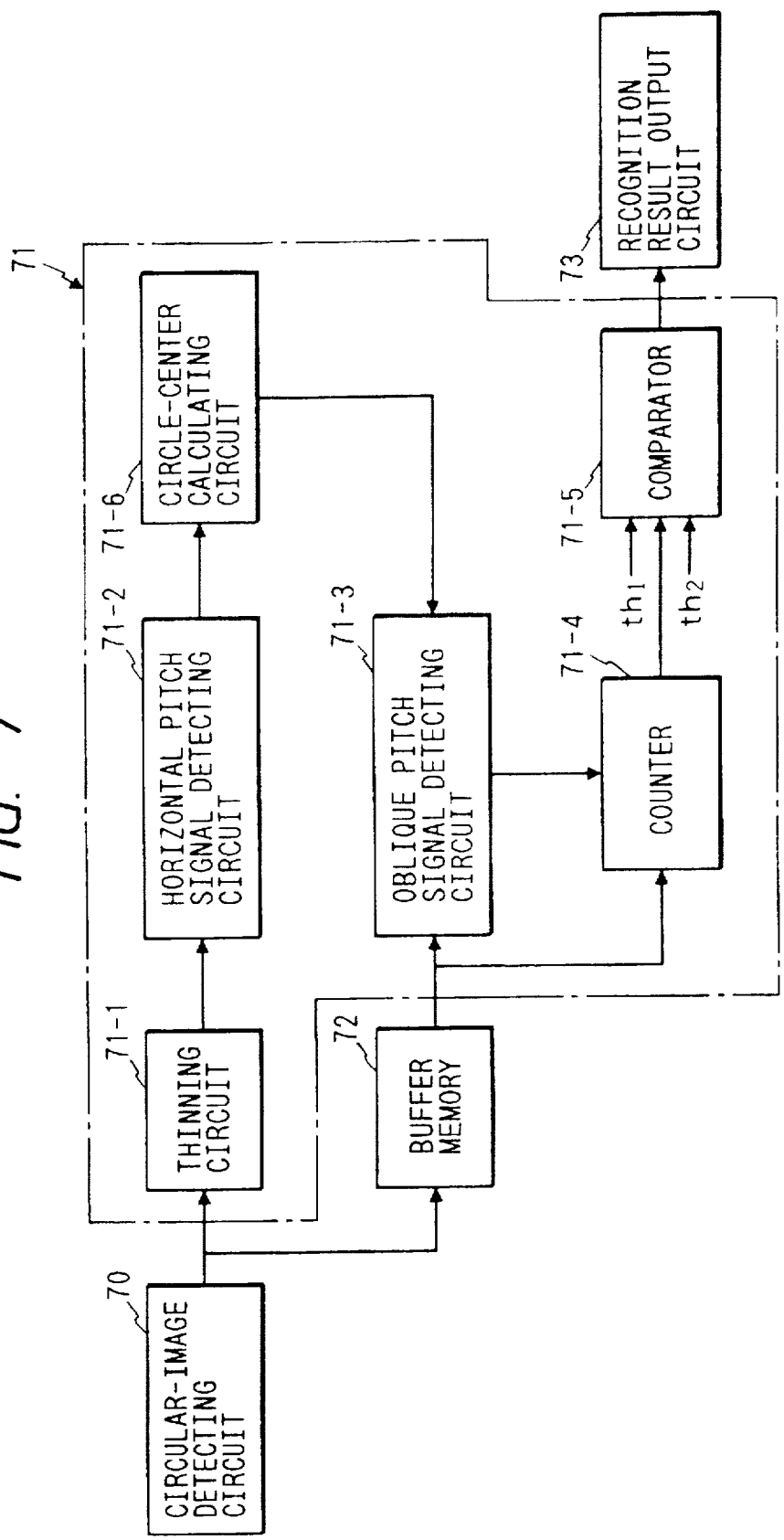
FIG. 7 is a block diagram showing the details of the concentric circle code discriminating system shown in FIG. 6.

A concentric circular code discriminating system for discriminating the concentric circular code is shown in block form in FIGS. 6 and 7.

The concentric circular code discriminating system, as shown in FIG. 6, includes a circular-image detecting circuit 70, a concentric-circle recognizing circuit 71, a buffer memory 72, and a recognition result output circuit 73. The circular-image detecting circuit 70 detects a concentric circles image on an original document. The concentric-circle recognizing circuit 71 stores the diameter of the concentric circles detected by the circular-image detecting circuit 70 or a pattern (pitch and distance) of the chord at a predetermined distance from the center of the circle. The circuit 71 compares the diameter or the pattern with that previously stored in the buffer memory 72, and when they are coincident with each other, the circuit 71 recognizes that the detected circular image corresponds to the specific concentric circles. The recognition result output circuit 73 outputs a signal representing the recognition result. Alternatively, the circuit 71 detects and stores the diameter of the concentric circles or the distances between the intersections of the circles and the chord at a predetermined distance from the center of the circle. When the distance data is coincident with that previously stored in the buffer memory 72, it is recognized that the detected circular image corresponds to the specific concentric circles.

A procedure to discriminate the concentric circle code by the concentric circle code discriminating system will be described with reference to FIG. 7 illustrating the details of the discriminating system of FIG. 6.

The image reading unit starts to scan an image (including the image of concentric circles) on an original document in the fast scan direction (CCD scan direction). The image data subsequently read are stored in the buffer memory 72. When the pixels at two positions separated from each other by the distance corresponding to the diameter of the concentric circle are detected, the system assumes that the pixels distanced by the diameter of the concentric circle are detected, and calculates the center position of the distance. If the buffer memory 72 stores the circle data at the positions of both ends of the diameter when it is turned a preset angle from the fast scan direction, the assumption is correct.

A plurality of circles of different thick values that are arranged at different intervals within the circle. The number N of pixels within the circle as the image stored in the buffer memory 72 is previously calculated by counting it. When it is equal to the number of pixels corresponding to the concentric circles, the detected circular image is determined as that of the specific concentric circles.

The image is detected by the circular-image detecting circuit 70 in FIG. 7 and stored in the buffer memory 72. At the same time, a thinning circuit 71-1 thins a fast scan direction detecting signal. The thinning operation provides an easy signal detection by a horizontal pitch signal detecting circuit 71-2. An inexpensive memory of a small memory capacity may be used for the buffer memory 72. The reason for this is that only a memory capacity necessary for detecting the slow scan direction and the oblique direction $d_0$ mm pitch signals is required when the fast scan direction $d_0$ mm pitch signal is detected.

When the circular-image detecting circuit 70 and the horizontal pitch signal detecting circuit 71-2 detect pixels, the pixels detected by them are determined to be the pixels at both ends of the diameter of the circle. A circle-center calculating circuit 71-6 calculates the center $x_0$ (FIG. 8) of the circle. An oblique or vertical pitch signal detecting circuit 71-3 checks as to whether or not the buffer memory 72 stores the circle pixel data corresponding to the positions of the $d_0$ mm pitch at the circumference when it is turned by a preset angle from the fast scan direction, for example, by 45° from the slow scan direction or the fast scan direction. When the circle pixel data is detected also by the oblique pitch signal detecting circuit 71-3, a counter 71-4 counts the number of pixels within the circle. A comparator 71-5 determines whether or not the count value of the counter is equal to the number of pixels previously stored by comparing them. When the number of pixels is within the upper and lower threshold values ($th_1$ and $th_2$), the comparator 71-5 determines or recognizes that the detected circle is the set concentric circle. A signal representing the result of this determination is output from a recognition result output circuit 73.

Figure 9:
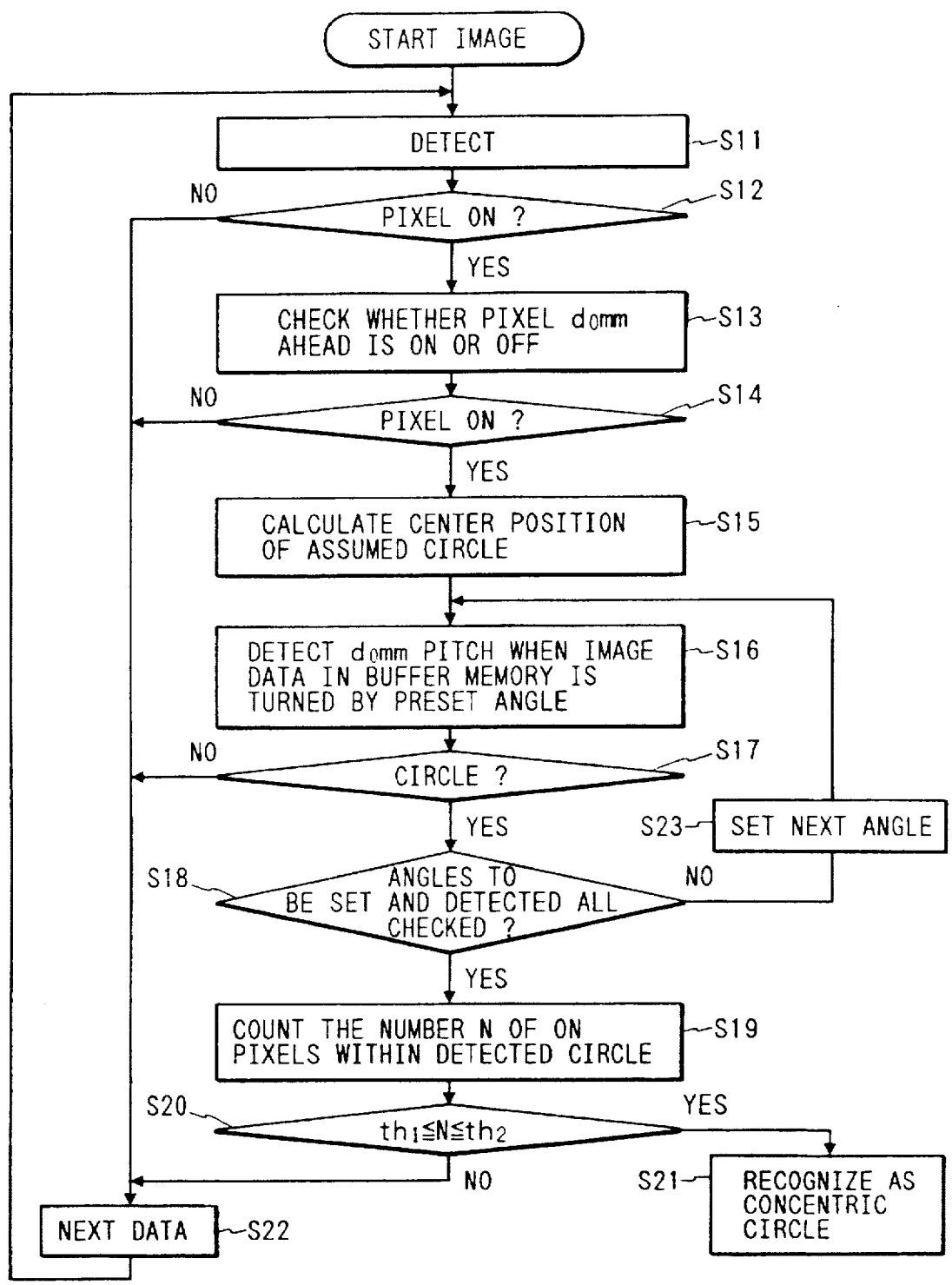
FIG. 9 is a flowchart showing a flow of a process to recognize the concentric circle code by the concentric circle code recognizing system shown in FIG. 7.

FIG. 9 is a flowchart showing a flow of a process to recognize the concentric circle by the concentric circle code discriminating system shown in FIG. 7.

In FIG. 9, at first, an image is detected (step S11), and it is determined whether or not the detected pixel is ON (step S12). If the detected pixel is ON, it is checked whether the pixel $d_0$ mm ahead is ON or OFF (step S13), and it is determined whether or not the pixel is ON (step S14). If the pixel is ON, the center position of an assumed circle is calculated (step S15), and the $d_0$ mm pitch is detected when the image data in buffer memory is turned by a preset angle (step S16). Then, it is determined whether or not the detected image is a circle (step S17). If the detected image is a circle, it is determined whether or not all the angles to be set and detected have been checked (step S18). If so, the number of ON pixels within the detected circle is counted (step S19), and it is determined whether or not the condition $th_1 \leq N \leq th_2$ is satisfied (step S20). If the condition is satisfied, the machine recognizes the detected image as a concentric circle (step S21). In step S12, S14, S17 or S20, if the answer is "No", the next data is received (step S22), going back to step S11. In addition, in step S18, if the answer is "No", the next angle is set (step S23), going back to step S16.

When a bank bill is set to an automatic money changing machine, the bank bill is set at a specific position. The use of cut-out marks of the circles or these marks being formed at specific positions may be employed for the coding purposes, in addition to the different thick values, different intervals, and different diameters of the circles. The use of such cut-out marks further enhances the illicit use check function.

To check the illicit copy of a bank bill, the concentric circle code is printed on the original document, and read and processed by the image processing system as described above. Additionally, the document may be designed in the following way.

1) A watermark like tracing paper is formed in the document.

The watermark cannot be copied. This feature is used for the illicit use check.

2) A mark of a special color is printed on the document.

Gold, silver, light pink, and the like cannot be exactly reproduced by the copying machine.

3) Gloss is applied to the print surface.

The gloss cannot be copied.

4) A magnetic tape is attached to the document. Iron particles or magnetized iron particles are attached to the document by print. Alternatively, transparent or white magnetic ink is applied to the document by print.

A magnetic sensor, which is mounted on the platen cover of the copying machine, senses the magnetic tape, particles or ink when the document is set on the platen.

5) The copying machine is designed so as to operate only for the print sheets of paper designated by the machine or the sheets of paper having a logo mark or marks printed on the reverse side thereof.

The machine is designed so as to reject the transportation of other sheets than the sheets designed above.

The concentric circle code discriminating system is preferably designed to be inoperable in copying a monochromatic document or a color document in the form of a monochromatic copy. If so designed, when an original document to be copied is of the type not requiring the process of discriminating the concentric circle code, the color copying machine can directly enter the copying operation without any interruption by the concentric circle code discriminating system.

Following the recognition of the circle image on the document, the system may compare a density histogram or density profile within the concentric circles that is previously stored, with a histogram or a density profile calculated using the number of ON pixels within the concentric circles on the document that are stored in the buffer memory, to discriminate the concentric circle code on the basis of the comparison result.

The handling of the bank bill using magnetic ink will be described. A bank bill detecting system is used which includes magnetic sensors for sensing this type of bank bill when the bank bill is located on the platen. The magnetic sensors are provided within the platen cover. This bank bill detecting system may be combined with the above-mentioned concentric circle code discriminating system so that the concentric circle code discriminating system is operated only when it receives a signal produced by the magnetic sensors when they sense the bank bill. With this arrangement, normal original documents other than bank bills can be efficiently copied without any interruption by the concentric circle code discriminating system. The concentric circle code discriminating system operating following the magnetic sensing operation can recognize the bank bills at sufficiently high accuracy by merely recognizing a circle of $d_0$ mm pitch of the concentric circles or a circle of the same pitch. A plurality of magnetic sensors may be disposed at key positions at intervals somewhat shorter than the print width of the magnetic ink. Those sensors are not necessarily provided over the entire surface of the platen cover.

In another method, when the magnetic sensors within the platen cover reactively operate, the 100% copy is prohibited without operating the concentric circle discriminating system.

Further, when the magnetic sensors react, a paper quality sensor may detect the quality of sheets of paper contained in the paper tray. If the detected paper quality is that of paper of the type possibly being illicitly used, the machine operation is stopped. In this case, the paper quality sensor may be attached to within the paper tray. Additionally, the machine is designed so as to produce a copy of the bank bill of which the color area alone is painted to have another color or to produce the copy developed using odor toner. As a matter of course, those operations may be combined properly.

Additionally, any of the following methods may be employed: 1) to increase gloss of the sheet of paper on which a document image is copied by any of or a combination of the above-mentioned methods, 2) to check as to whether or not the print is present on the reverse side by a photo sensor, for example, located near the register roller when the machine operates in a both-side copy mode (particularly when manually operated), and 3) to detect a friction (slip) of the feed roller at the time of both-side copy decision. The machine determines whether or not the copy is to be illicitly used on the basis of the result by any of the above methods. If the copy may be illicitly used, the machine stops the copying operation.

In another effective method, a histogram of densities or a print pattern peculiar to the original document, such as a bank bill, for example, the number of the detected pixels in each of density areas, is stored in a memory. Check as to whether or not the original document is legally prohibited from being copied is made on the basis of the stored data. The histogram may be prepared for a specific area or areas on the document or the entire area thereon.

In an additional method, densities or a profile of a print pattern peculiar to an original document, for example, density variations in the direction orthogonal to the coordinate axes longitudinally extending on the document, is stored in a memory. The stored data is used for checking whether or not the original document to be copied is legally prohibited from being copied. The profile may be prepared for a specific area or areas on the document or the entire area thereon.

In a further method, the features of a specific portrait on a bank bill are stored in a memory. When input image data satisfies the features, it is determined that the original document set to the machine is a bank bill. Since a transparency is the chief note of the bank bill, the features of the transparency on the bank bill may be used in lieu of the features of the portrait.

Figure 10:
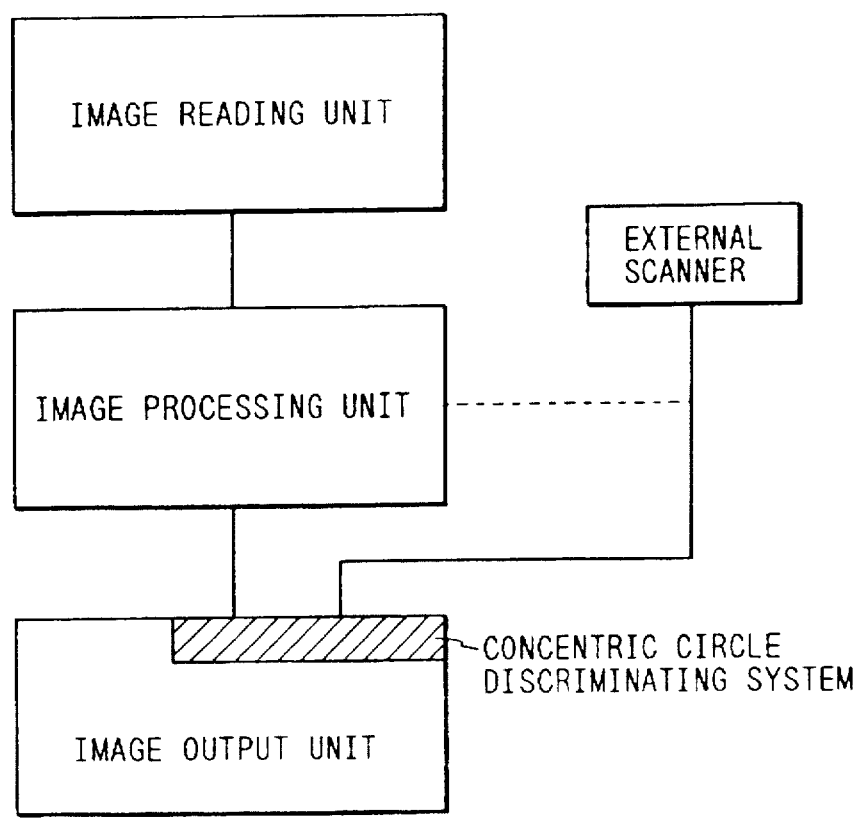
FIG. 10 is a block diagram showing a hardware arrangement of the concentric circle code recognizing system.

A hardware arrangement of an image processing system with the concentric circle discriminating system is shown in FIG. 10. As shown, the concentric circles discriminating system is contained in an image output unit. In this arrangement, not only a scanner signal from the image input unit but also a scanner signal the image output unit directly receives from an external device may be passed through the concentric circle discriminating system.

When the concentric circle discriminating system identifies the concentric circles, the document now set on the platen is a bank bill, the timings to start the writing of the images on the obverse and reverse sides of the sheets of paper may be set random by using a table of random numbers. When the times to start the image writing vary unpredictively, it is impossible to copy the bank bill.

In another method to check the illicit use of the bank bill copy, after the concentric circle discriminating system identifies the concentric circles, a series of characters meaning a copy of the bank bill, for example, a message of "COPY", "UNUSABLE" or the like, may be automatically printed in the form of a logo mark on either obverse or reverse side of the copy.

The logo mark by the manufacturer of the copying machine may be printed on the sheet immediately after the machine has completed the copying operation or in a standby mode of the machine. The print of the logo mark checks the illicit use of the bank bill copy. The print of the logo mark on all of the copies is useful also in preventing an infringement of copyrights. This is particularly useful since recent high performance color copying machines can readily copy artistic photographs.

Various possible methods for checking the illicit use of bank bill copies have been described in connection with the concentric circle discriminating system. It is evident that the present invention is operable for checking the illicit use of other documents than the bank bills. The illicit use check methods as described above may be properly combined, if required.

Figure 11:
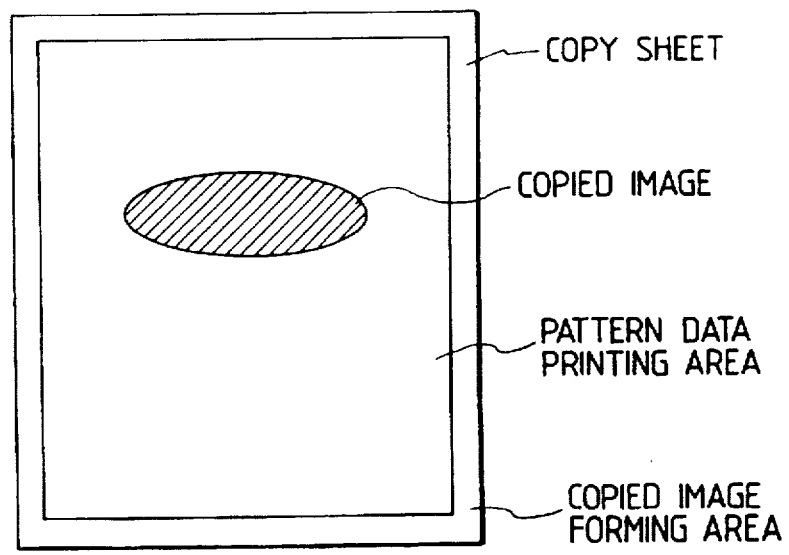
FIG. 11 is a diagram showing a sheet of paper having an additional pattern printed thereon.

Next, an image processing system which prints an image with an additional pattern will be described. In the image processing system, the additional pattern printed prevents a copy from being illicitly used. FIG. 11 is a diagram showing a sheet of paper having an additional pattern printed thereon.

A copy sheet after processed by the image output unit includes a pattern data print area laid over a copied image forming area in which a copied image is formed. A pattern image contained in the machine is printed on this pattern data print area. The pattern data print area may be set within the entire copied image forming area. In this case, the additional pattern data is printed being added to all of the read image data. Alternatively, the pattern data area may be set within only a specific area of the copied image forming area. Selection for setting the pattern data print area depends on the machine specifications. The specific area is, for example, a specific density area of the image data.

The pattern data or information is divided into character information and coded information. The character information consists of combinations of numerals and symbols. The coded information is significant information consisting of combinations of dots. In the character information, the combinations of numerals and symbols may be significant or nonsignificant. The pattern information is formed by areas, densities or combinations of them. The area and density must be below the threshold of visual perception of the eyes of a human being. In the case of the coded information, the area or density of each dot used for the coded information is set below the threshold of visual perception.

Usually, the color copying machine like the printing machine uses four color prints of yellow, magenta, cyan, and black. A specific color, e.g., a single color or a combination of those colors, is used for printing the pattern information. The specific color is preferably yellow to which the eyes of a human being are sensitive to the smallest degree.

When the pattern information is laid in a white area, it is distinguished when it has some type of the specific color. To avoid this, the density control of the pattern information must be accurately controlled. The density control of the pattern information is easy if the pattern information is set in an area having densities at which the specific color is not distinguished, that is, an area other than the white area.

Figure 12:
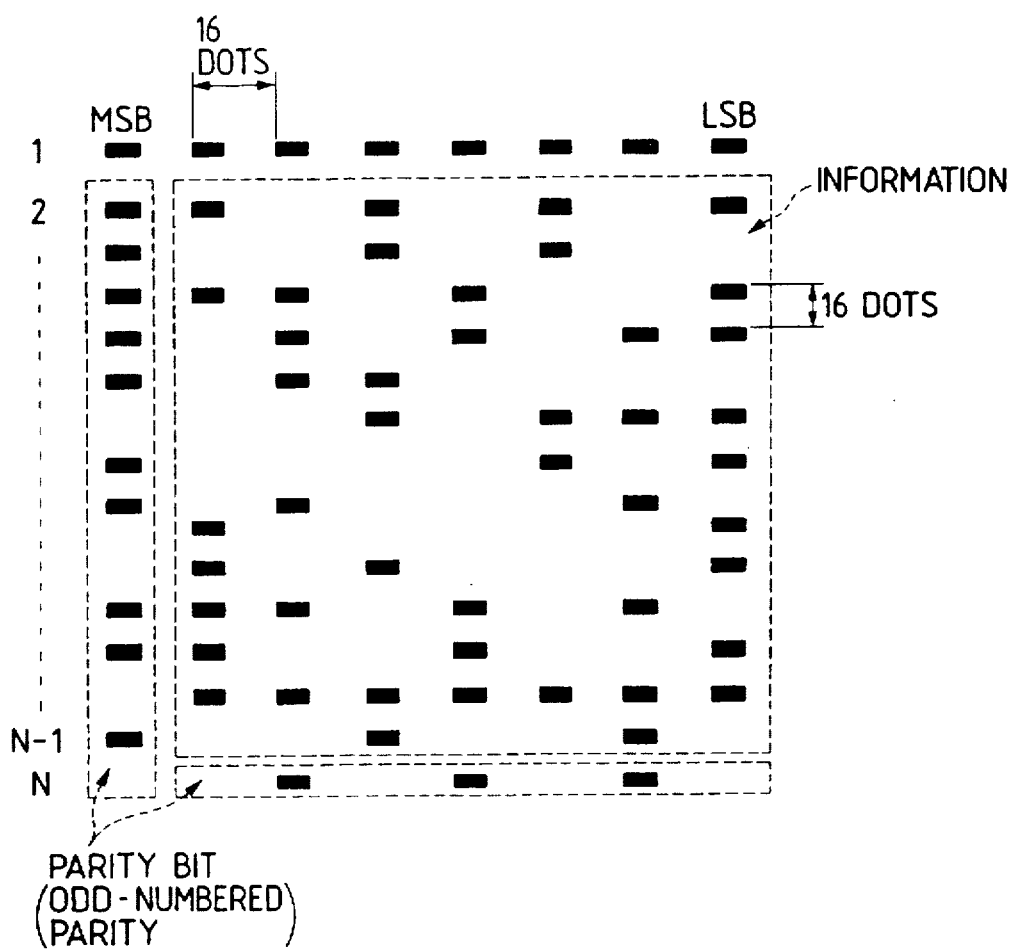
FIG. 12 is a diagram showing a sheet of paper having coded information printed thereon as the pattern information.

For the coded information, a series of characters are converted into code data, which is then converted into pattern data expressed in a bit train of one line. The thus converted pattern data is added to the digital image data. An example of pattern data is shown in FIG. 12. In this example, the character train of the pattern data is converted into ASCII codes. One byte code is converted into pattern data expressed in the form of one line bit train. One bit is expressed by a dot pattern consisting of two pixels arrayed in the fast scan direction and one pixel in the slow scan direction. The density is the highest density that can be reproduced by the image output unit. The coded information consists of only alphanumerics in this instance of the embodiment, of 8 bits of the ASCII codes, 7 bits are used for character data, and the remaining one bit (MSB (most significant bit)) is for error check data (check for the odd-numbered parity). FFh as an indicator of the digit position for the second line and subsequent ones is placed on the first line. Bit trains of the ASCII are placed on the second to (N-1)th lines. Data for vertical parity check is placed on the Nth line.

The embodiment as mentioned above has the following advantages. The dot pattern is less distinguished than the character information since extremely small dot areas are used for the pattern recognition. The density control is easy since the dot recognition is less insensitive to the density than the character information.

Figure 13:
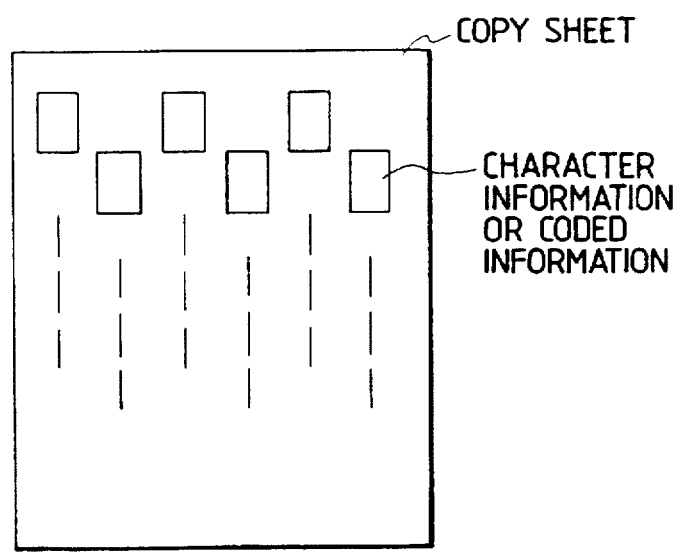
FIG. 13 is a diagram showing a sheet of paper having periodic pattern information printed thereon.

Next, the image processing of the pattern information, when printed, is arrayed over the entire surface of a copy sheet will be described. The pattern information entirely arrayed over the copy sheet surface effectively prevents a part or parts of the copy sheet from being illicitly used. FIG. 13 is a diagram showing a copy sheet on which periodic pattern information is printed. As shown, a number of rectangular blocks, forming the pattern information, are regularly arrayed over the entire surface of a copy sheet in the horizontal and vertical directions. Even if the copy sheet with the pattern information entirely arrayed thereon is cut into segmental sheets for the illicit use purpose, each segmental sheet has the pattern information printed thereon, so that these sheets cannot be used for such a purpose.

Figure 14:
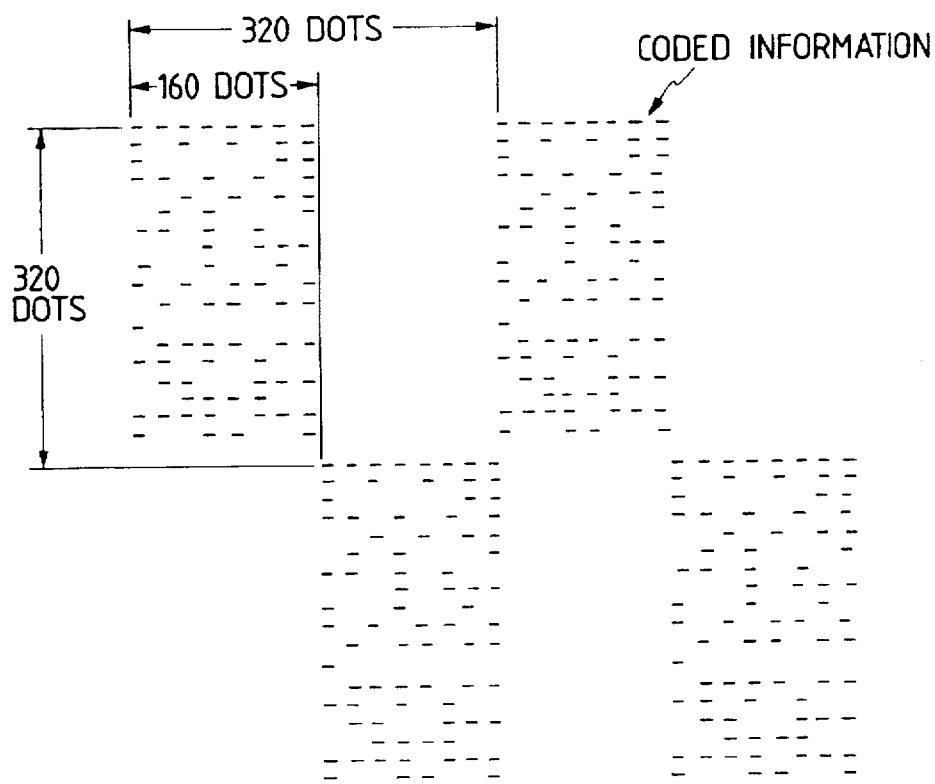
FIG. 14 is a diagram showing a sheet of paper having periodic coded information printed thereon.

FIG. 14 is a diagram showing a sheet of paper on which periodic coded information is printed. A number of shot lines, forming the pattern information, are periodically arrayed in a mesh fashion within an area of 320 dots in height and 160 dots in width.

Figure 15:
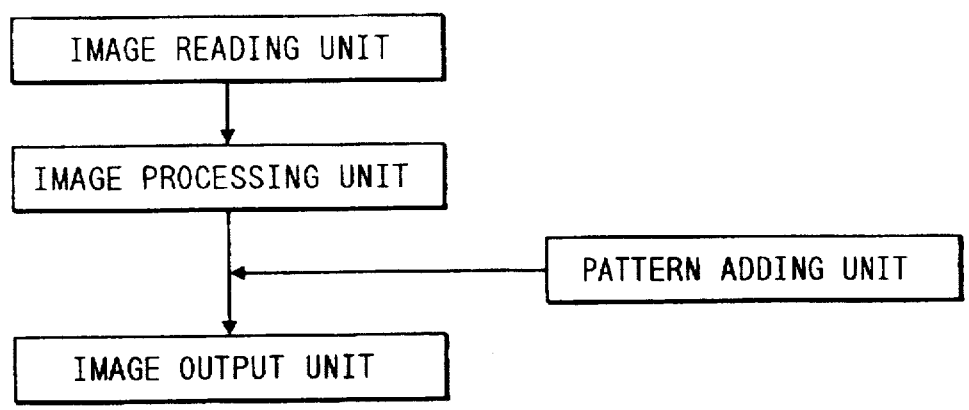
FIG. 15 is a block diagram showing a hardware arrangement of an image processing system with a pattern-information adding function.

FIG. 15 is a block diagram showing a hardware arrangement of an image processing system with a pattern-information adding function. The construction of the system, which reads an image on an original document every pixel by a scanner, processes the read image data, and outputs the processed image data, is the same as that of FIG. 4. Accordingly, no description of the system will be given.

Figure 16:
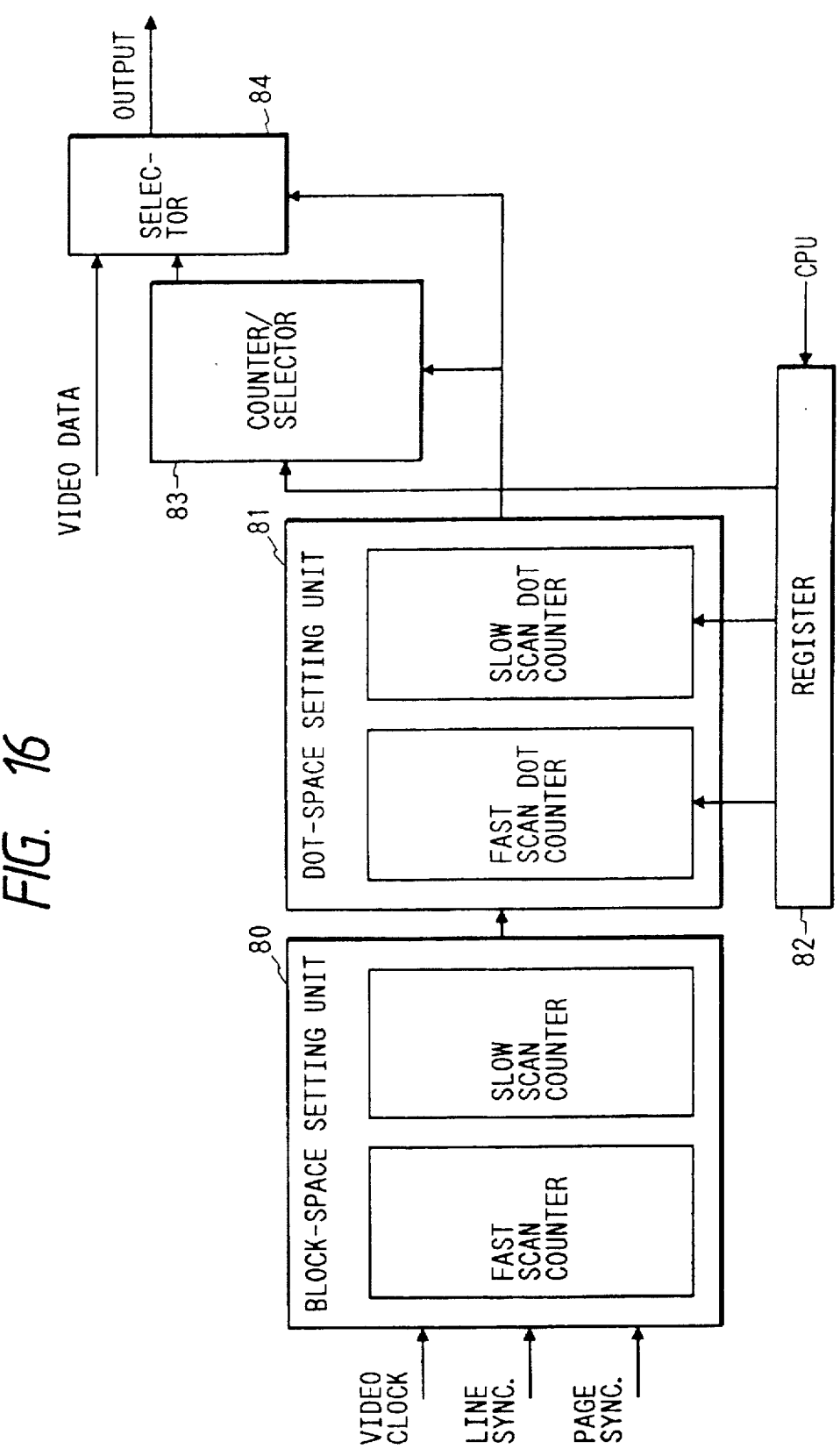
FIG. 16 is a block diagram showing a hardware arrangement of a periodic pattern-information adding system.

The pattern adding unit adds the pattern data to the digital image data processed by the image processing unit. In the description of the pattern adding unit, the pattern information is the coded information. FIG. 16 is a block diagram showing a hardware arrangement of a periodic pattern-information adding system.

A block-space setting unit 80 sets the repetitive periods in the pattern information.

A dot-space setting unit 81 sets the spaces among dots of the pattern information.

A register 82 receives the dot space and ON/OFF of the dots from a CPU, and retains them therein.

A counter/selector 83 controls print and nonprint of dots in accordance with the dot spaces set by the dot-space setting unit 81 and the ON/OFF data of the dots from the register 82.

A selector 84 selects the video data or the pattern data as the output data.

In the present embodiment, the pattern data is added to all of the digital image data that is read. However, the pattern information adding system may be prohibited in operation till the image data is coincident with the prestored image data to be inhibited from being copied as the result of comparing them.

The documents to be inhibited from being copied that are handled in the present invention are bank bills, marketable securities such as stock certificates and loan bonds, commutation tickets, entrance tickets, notes, and the like.

The image processing system of the present invention is applicable for facsimile machines and printers as well as copying machines.

As has been described heretofore, the least memory capacity is required for the memory device used in the present invention. The circular image, particularly the circular red print of the bank bill, can be detected at a relatively low cost. Accordingly, a normal illicit use check function can be achieved at a relatively low cost. Therefore, the illicit use check system of the invention may be incorporated into color copying machines of low cost.

The circular image of concentric circles, when printed on the document, effectively prevents the copied document from being illicitly used. This circular image can be printed easily. The concentric circles can be easily detected by using a relatively low cost image processing system.

The image processing system having the pattern information adding function prints pattern information on a copy sheet, thereby preventing reproduced documents, such as bank bills, from being illicitly used. When the pattern information is printed below the threshold level of visual perception, the printed pattern information is not or scarcely seen. Accordingly, the illicit use of the reproduced documents can be checked without deteriorating the image quality of the reproduced picture.

The foregoing description of the preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. An image processing system which reads, in pixel units, an image on an original document using a scanner, processes the read image, and outputs image data, said original document comprising a circular image including a plurality of concentric circles, said concentric circles representing coded information by at least one of widths of lines of the circles, spaces between adjacent lines of the circles, and diameters of the circles, said image processing system including:

detecting means for detecting a first pixel of the image;

circle detecting means for determining whether a second pixel positioned a predetermined distance from the first detected pixel is on, and for recognizing a circle when the second pixel is on;

center calculating means for calculating a center of the recognized circle;

concentric circle recognizing means for recognizing a concentric circle surrounding the recognized circle; and determining means for determining whether at least one of the widths of lines of the concentric circles, spaces between adjacent lines of the circles, and diameters of the circles of the recognized concentric circle correspond to a predetermined concentric circle.

2. The image processing system according to claim 1, wherein said processing system is provided in an image output means to which an image signal read by an external scanner is applied.

3. The image processing system according to claim 1, further comprising a magnetic sensor, disposed within a platen cover, for sensing magnetic flux from the original document.

4. The image processing system according to claim 1, wherein reading of the circular image is repeated a plurality of times while turning the image data by a predetermined angle.

* * * * *